(12) United States Patent
Collier et al.

(10) Patent No.: US 7,536,475 B2  
(45) Date of Patent: May 19, 2009

(54) METHOD AND SYSTEM FOR MANAGEMENT AND CONTROL OF AN AUTOMATION CONTROL MODULE

(75) Inventors: David Scott Collier, Charlottesville, VA (US); Daniel H. Miller, Waynesboro, VA (US); Robert Baxter Chambers, II, Barboursville, VA (US); Ferrell Louis Mercer, Madison, VA (US); Jason Daniel Kadingo, Palmyra, VA (US); Brad J. Bolfing, Charlottesville, VA (US); David Charles Elliott, Ruckersville, VA (US)

(73) Assignee: GE Fanuc Automation North America, Inc., Charlottesville, VA (US)

(*) Notice: Subject to any disclaimer, the term of this patent is extended or adjusted under 35 U.S.C. 154(b) by 622 days.

(21) Appl. No.: 10/238,361

(22) Filed: Sep. 10, 2002

(65) Prior Publication Data  
US 2004/0049590 A1    Mar. 11, 2004

(51) Int. Cl.  
*G06F 15/16* (2006.01)

(52) U.S. Cl. .......... 709/236; 709/217; 709/220; 709/223; 709/250

(58) Field of Classification Search .......... 709/212, 709/217, 220, 221, 223, 246, 250, 236  
See application file for complete search history.

(56) References Cited

U.S. PATENT DOCUMENTS

| | | | |
|---|---|---|---|
| 6,061,603 A * | 5/2000 | Papadopoulos et al. | 700/83 |
| 6,584,074 B1 * | 6/2003 | Vasamsetti et al. | 370/254 |
| 6,826,597 B1 * | 11/2004 | Lonnroth et al. | 709/207 |
| 6,854,120 B1 * | 2/2005 | Lo et al. | 719/311 |
| 6,937,595 B2 | 8/2005 | Barzegar et al. | |
| 6,986,069 B2 * | 1/2006 | Oehler et al. | 713/320 |
| 2003/0028577 A1 * | 2/2003 | Dorland et al. | 709/100 |
| 2003/0046231 A1 * | 3/2003 | Wu | 705/43 |
| 2003/0093468 A1 * | 5/2003 | Gordon et al. | 709/203 |
| 2003/0110167 A1 * | 6/2003 | Kim | 707/4 |
| 2003/0140132 A1 * | 7/2003 | Champagne et al. | 709/223 |
| 2003/0225965 A1 * | 12/2003 | Krishnan | 711/108 |
| 2004/0113743 A1 | 6/2004 | Sezai et al. | |
| 2005/0144457 A1 * | 6/2005 | Lee et al. | 713/176 |
| 2007/0202800 A1 * | 8/2007 | Roberts et al. | 455/3.02 |

* cited by examiner

*Primary Examiner*—Nathan J Flynn  
*Assistant Examiner*—Mohamed Wasel  
(74) *Attorney, Agent, or Firm*—Mark A. Conklin, Esq.; Armstrong Teasdale LLP

(57) ABSTRACT

An automation control module (ACM) is provided that includes an ACM central processing unit (CPU), a backplane and a SOAP/XML and web server system electrically coupled to the backplane and to the ACM CPU. The SOAP/XML and web server system is embedded within the automation control module (ACM) and is configured to process simple object access protocol (SOAP)/extensible markup language (XML) requests from a network.

28 Claims, 4 Drawing Sheets

```
POST /PLCData HTTP/1.1                                          ⎫
Host: www.my_plc.com                                            ⎪
Content-Type: text/xml charset="utf-8"                          ⎬ — 102
Content-Length: nnnn                                            ⎪
SOAPAction: PLCData-Namespace-URI#GetRefVal                     ⎭

┌─ 108
<SOAP-ENV:Envelope                                                       │
  xmlns:SOAP-ENV="http://schemas.xmlsoap.org/soap/envelope/"    ⎫— 106
  SOAP-ENV:encodingStyle="http://schemas.xmlsoap.org/soap/encoding/"⎭
<SOAP-ENV:Body>  ─ 104                                          ⎫
    <m:GetRefVal xmlns:m="PLCData-Namespace-URI">  ─ 112        ⎪
        <table>%R</table>            ── 114                     ⎪
        <start_add>100</start_add>   ── 116                     ⎬ — 110
        <length>10</length>          ── 118                     ⎪
        <format>+-Dec</format>       ── 120                     ⎪
        <confirm>true</confirm>      ── 122                     ⎪
    </m:GetRefVal>                                              ⎪
</SOAP-ENV:Body>                                                ⎪
</SOAP-ENV:Envelope>                                            ⎭
```

FIG. 3

```
HTTP/1.1 200 OK
Content-Type: text/xml charset="utf-8"
Content-Length: nnnn

<SOAP-ENV:Envelope
 xmlns:SOAP-ENV="http://schemas.xmlsoap.org/soap/envelope/"
 SOAP-ENV:encodingStyle="http://schemas.xmlsoap.org/soap/encoding/">
 <SOAP-ENV:Body>
   <m:GetRefValResponse xmlns:m="PLCData-Namespace-URI">
     <return>21:21000:31000;-23000:19:66:17:8:99:1010:%R:100</return>
   </m:GetRefValResponse>
 </SOAP-ENV:Body>
</SOAP-ENV:Envelope>
```

FIG. 4

METHOD AND SYSTEM FOR MANAGEMENT AND CONTROL OF AN AUTOMATION CONTROL MODULE

BACKGROUND OF THE INVENTION

This invention relates generally to automation control modules (ACMs) and more particularly to management and control of ACMs.

This invention relates generally to automation control modules (ACMs) and more particularly to management and control of ACMs.

Remote monitoring and control of systems and processes have taken many forms. In the past, dedicated lines became the most common form of communication between a control system and a remote location. However, such systems have limited application since the control systems are not accessible from multiple locations. Modems have made it possible to access the control system from different locations, but these types of systems are generally restricted to downloading and uploading data files. Moreover, providing any type of control function between locations is rather limited in this type of environment.

Programmable logic controllers (PLCs) are widely used in industry and process control. At least some known systems provide factory automation information using various types of communication networking environments. These networks are usually slow, are not universally accessible and are limited to monitoring and data exchange. Control may be implemented, but since the communication networks are non-deterministic, control is not in real time. Specialized industrial networks using proprietary fieldbus alternatives can be very expensive. Conversion products are required to allow information carried over those networks to be visible on a general purpose network. There may be significant installation and other deployment costs associated with the existence of such intermediate devices.

At least some known applications and programs for ACMs are executed on general purpose computers that communicate with the ACMs over proprietary networks and protocols However, developing and maintaining the proprietary networks and protocol increases the cost of ACM systems. Furthermore, because access to ACM data is typically restricted, communication between the general purpose computer and the ACM must be handled in a secure manner. As a result, such additional security measures also increases an overall cost of the ACM systems.

BRIEF DESCRIPTION OF THE INVENTION

In one aspect, an automation control module (ACM) is provided including an ACM central processing unit (CPU) and a SOAP/XML and web server electrically coupled to the ACM CPU. The SOAP/XML and web server is configured to process simple object access protocol (SOAP)/extensible markup language (XML) requests from a network.

In another aspect, an automation control module (ACM) system is provided. The system includes an ACM, a network, a computer electrically coupled to the network and configured to communicate with the network, and a SOAP/XML and web server electrically coupled to the ACM and the network. The subsystem is configured to process simple object access protocol (SOAP)/extensible markup language (XML) requests received from the computer through the network.

In yet another aspect, a method is provided for management and control of an automation control module (ACM) including an ACM central processing unit (CPU), a SOAP/XML and a web server system. The SOAP/XML and web server system is electrically coupled to a network. The method includes electrically connecting the SOAP/XML and web server system to the ACM CPU and processing simple object access protocol (SOAP)/extensible markup language (XML) requests from the network using the SOAP/XML and web server system

BRIEF DESCRIPTION OF THE DRAWINGS

FIG. 3 is an example of a SOAP/XML request message.

FIG. 4 is an example of a SOAP/XML response message.

DETAILED DESCRIPTION OF THE INVENTION

Set forth below are descriptions of embodiments of methods and systems for control and management of an automation control module (ACM). The methods and systems facilitate viewing and controlling ACM data through standard networks, protocols, and browsers, developing and downloading user-defined web pages that include ACM data, and controlling the access level to the ACM and user-defined web pages.

The methods and systems are not limited to the specific embodiments described herein. In addition, components of each system and steps of each method can be practiced independent and separate from other components and steps described herein. Each component and step can also be used in combination with other components and steps.

As used herein, the term ACM refers to any device used to control the automation of an activity, including but not limited to PLCs, computer numeric controls (CNCs), motion control products, home automation products, and commercial automation products, for example controls for automated teller machines or car wash systems. As used herein, ACM data includes different types of data within an ACM system 10 that control operation of ACM system 10. ACM data includes, but is not limited to, user logic programs, user program memory, ACM status and statistics, ACM faults, setting ACM operating states, setting privilege levels, and any other useful ACM information.

Figure 1:
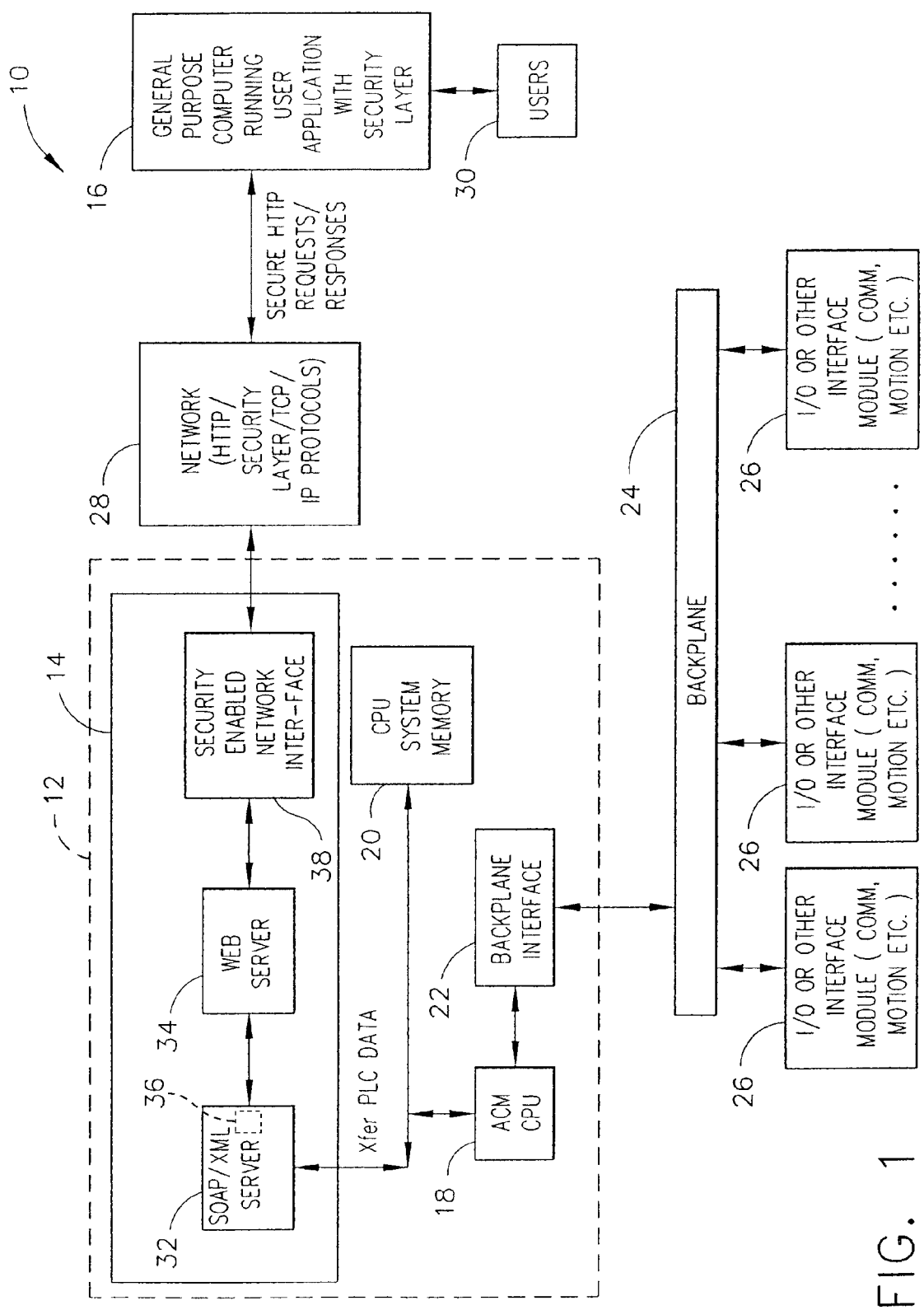
FIG. 1 is a block diagram illustrating one embodiment of an ACM system of the present invention.

FIG. 1 illustrates, in block diagram form, exemplary hardware architectures that can be utilized in conjunction with an ACM management and control system. The system can be implemented on many different platforms and utilize many different architectures. The architectures illustrated in FIG. 1 are exemplary only.

FIG. 1 is a block diagram illustrating one embodiment of ACM system 10. System 10 includes an ACM 12, a SOAP/XML and web server system 14, and a web-enabled computer 16. ACM 12 includes an ACM CPU 18 that carries out ACM functions, for example user logic and function block executions, input/output (I/O) scanning, and communications to other devices. ACM CPU 18 includes a CPU system memory 20 electrically coupled to CPU 18 and, in one embodiment, contains both the operating system (not shown) for ACM CPU 18 and a user's program and data. In one embodiment, an ACM backplane interface 22 is coupled to ACM CPU 18, and provides an interface between ACM CPU 18 and an ACM backplane 24 coupled to interface 22. ACM backplane 24 provides a physical and electrical means for connecting various I/O or other input modules 26, for example communications or motion modules, into eWeb ACM 12. ACM backplane 24 facilitates the exchange of data between modules 26 and ACM CPU 18. In one embodiment, one or more modules 26 provide an interface for real world inputs (not shown), such as limit or proximity switch status, position of an object, temperature, or pressure, to ACM CPU 18 as parameters for logic or function block execution. In another embodiment, one or more modules 26 provide an interface to real world outputs (not shown) as commanded by ACM CPU 18 to control output devices (not shown), such as actuators, contactors, or solenoids.

Web-enabled computer 16 is electrically coupled to a network 28. Network 28 includes the physical medium and intermediate devices (not shown), such as routers, and switches, that connect computer 16 to ACM 12. In one embodiment, network 28 is a wide area network (WAN), such as the Internet. In an alternative embodiment, network 28 is a local area network (LAN), such as an Intranet. A user 30 accesses, such as dialing into, or directly logging onto, an Intranet or the Internet to gain access to ACM 12. In one embodiment, computer 16 includes a web browser, and ACM 12 is accessible to computer 16 via the Internet. Computer 16 is intercoupled to the Internet through many interfaces including a different network (not shown), such as a WAN or a LAN, dial in connections, cable modems and special high-speed ISDN lines. Computer 16 is any device capable of interconnecting to the Internet, including a web-based telephone or other web-based connectable equipment.

Computer 16 runs a user application that makes decisions based on ACM data transferred from ACM 12 using web server subsystem 14 and network 28. Computer 16 requests/transfers ACM data using a simple object access protocol (SOAP)/extensible markup language (XML) server 32 embedded within SOAP/XML and web server subsystem 14. SOAP/XML server 32 includes an independent processor. SOAP/XML requests may contain hypertext transfer protocol (HTTP), hypertext markup language (HTML), and/or references to other files. In another embodiment, SOAP/XML requests include ACM tag functions that reference ACM data stored in CPU system memory 20. The tag facilitates the exchange of data between ACM CPU 18 and a SOAP/XML server 34 embedded within SOAP/XML and web server subsystem 14. In one embodiment, computer 16 includes web authoring tools and/or text editors that, along with user input, are utilized to create and modify SOAP/XML requests.

Users 30 include at least one person who views and/or controls ACM data from computer 16. In one embodiment, users 30 include a person who creates an application that uses a SOAP/XML client to view and/or control ACM data. SOAP/XML and web server subsystem 14 is electrically coupled to ACM CPU 18, CPU system memory 20, and network 28. Subsystem 14 is shown in FIG. 1 to be embedded within ACM 12. In an alternative embodiment, subsystem 14 is contained in a separate module coupled to backplane 24. SOAP/XML and web server subsystem 14 includes SOAP/XML server 32, web server 34, and a network interface 38 that provides the lower level protocols (TCP/IP) and physical hardware connections to network 28. Web server 34 is electrically coupled to SOAP/XML server 32 and network interface 38, and transfers SOAP/XML requests and responses, and associated elements, between SOAP/XML server 32 and computer 16.

SOAP/XML server 32 is electrically coupled to web server 34, ACM CPU system memory 20, and ACM CPU 18. Web server 34 receives SOAP/XML requests from computer 16 via network 28 and network interface 38. The SOAP/XML requests are generated by a user program on computer 16 and passed to a SOAP/XML client element (not shown) in computer 16. The SOAP client element in computer 16 transfers the SOAP/XML requests using HTTP protocol to web server 34 via network 28 and network interface 38. Web server 34 then transfers the SOAP/XML requests to SOAP/XML server 32. SOAP/XML server 32 process the request, sends a response indicating the success or failure of the request to computer 16 via web server 34, network interface 38, and network 28. If the SOAP/XML request includes a tag function, SOAP/XML server 32 parses and executes the tag function and either embeds ACM data from ACM CPU 18 and/or CPU system memory 20 within a SOAP/XML response to computer 16 via web server 34, network interface 38, and network 28, or transmits ACM data to ACM CPU 18. In one embodiment, SOAP/XML server 32 transfers ACM data to ACM CPU 18 to control operation of ACM 12.

In one embodiment, user 30 must enter a valid user name and valid user password to access ACM 12 and SOAP/XML and web server subsystem 14. The user name and user password correspond to a user profile stored in SOAP/XML server 32 or web server 34.

Figure 2:
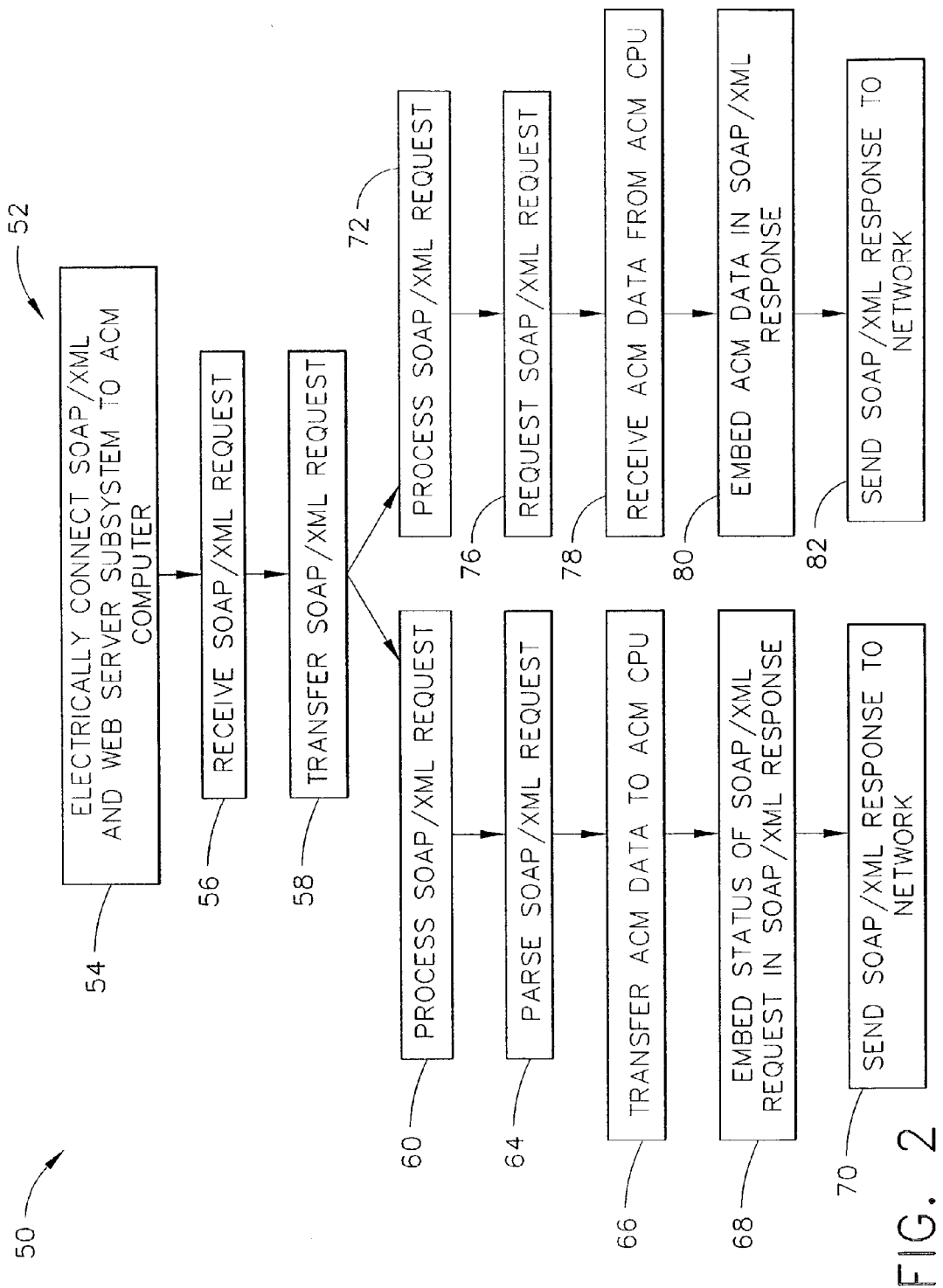
FIG. 2 is a flow chart illustrating one embodiment of a method for management and control of an automation control module using an ACM system.

FIG. 2 is a flow chart 50 illustrating an exemplary method 52 for management and control of ACM 12 (shown in FIG. 1). Method 52 includes electrically connecting 54 SOAP/XML and web server subsystem 14 (shown in FIG. 1) to ACM CPU 18 (shown in FIG. 1). Web server 34 receives 56 SOAP/XML requests from network 28 (shown in FIG. 1) and transfers 58 the SOAP/XML requests to SOAP/XML server 32 (shown in FIG. 1) which processes 60 the SOAP/XML requests. In one embodiment, SOAP/XML 32 processes 60 the SOAP/XML requests, parses 64 the SOAP/XML requests for tag functions that transfer 66 ACM data to ACM CPU 18 to control operation of ACM 12, embeds 68 the status of the tag function within the SOAP/XML response, and sends 70 the SOAP/XML response through web server 34 to network 28. In another embodiment, SOAP/XML server 32 processes 72 the SOAP/XML requests, requests 76 ACM data from ACM CPU 18 based on parsing the tag functions from the SOAP/XML request, and receives 78 ACM data from ACM CPU 18. Further, SOAP/XML server 32 embeds 80 the received ACM data within the SOAP/XML response through web server 34 and sends 82 the SOAP/XML response to network 28.

FIG. 3 is an exemplary embodiment of an SOAP/XML request message 100. Message 100 is sent using HTTP POST function as defined within the HTTP protocol. The POST function is used to request that the web server accept the information enclosed in the request as a data to be acted upon by the server in a server specific way. An HTTP header 102 includes information required to fulfill POST protocol. Message 100 includes a tag 104 and namespace designation 106 to indicate conformance to SOAP protocol. Message 100 further includes an optional namespace designation 108 for describing types of attributes such as boolean, float, integer, etc. A body tag 110 contains information to be exchanged with SOAP/XML server 32. Body tag 110 includes a namespace element 112 to uniquely define the element. Tags 114, 116, 118, 120, and 122 provide parameters that determine the value to read from ACM 12 and how to return ACM data.

FIG. 4 is an exemplary embodiment of a SOAP/XML response message 200. Message 200 includes information required by HTTP to indicate a success or failure the SOAP request. Message 200 includes a body tag 202, and envelope tag 204 and a return tag 206.

ACM system 10 facilitates reducing system hardware costs, shortening development time of custom ACM monitoring and control tools that reduce implementation costs, and increasing response time for accessing ACM data while reducing an impact on other critical real-time ACM functions, such as ACM sweep time, thereby reducing production costs. In addition, ACM system 10 facilitates rapid access to ACM data on standard devices such as computer 16 or PDA via a standard network. Furthermore, because SOAP/XML server 32 includes an independent processor 36, SOAP/XML server 32 facilitates maximum performance of ACM CPU 18.

While the invention has been described in terms of various specific embodiments, those skilled in the art will recognize that the invention can be practiced with modification within the spirit and scope of the claims.

What is claimed is:

1. An automation control module (ACM) comprising:
   an ACM central processing unit (CPU) configured to carry out ACM functions including at least one of user logic and function block executions, input/output (I/O) scanning, and communications with other devices;
   a system memory coupled to said ACM CPU, said system memory comprising an operating system;
   a backplane configured to couple at least one I/O module to said ACM;
   said ACM and said backplane are electronically coupled to a backplane interface; and
   a SOAP/XML and web server system electrically coupled to said backplane and said ACM CPU, and configured to process simple object access protocol (SOAP)/extensible markup language (XML) requests from a network, said SOAP/XML and web server system are embedded within said ACM and comprising a SOAP/XML server including an independent processor.

2. The ACM in accordance with claim 1 wherein said SOAP/XML and web server system comprises a web server electrically coupled to the network and a SOAP/XML server electrically coupled to said ACM CPU and said web server, said SOAP/XML server configured to process SOAP/XML requests from the network.

3. The ACM in accordance with claim 2 wherein said web server configured to receive SOAP/XML requests from the network and transfer the SOAP/XML requests to said SOAP/XML server.

4. The ACM in accordance with claim 3 wherein said SOAP/XML server configured to respond to SOAP requests from the network.

5. The ACM in accordance with claim 2 wherein said SOAP/XML server configured to transfer ACM data from said ACM CPU through said web server to the network.

6. The ACM in accordance with claim 2 wherein said SOAP/XML server configured to transfer ACM data received from the network via said web server to said ACM CPU.

7. The ACM in accordance with claim 2 wherein said SOAP/XML server configured to transfer ACM data from said ACM CPU and embed said ACM data within said SOAP/XML response based on function tags embedded within said SOAP/XML request.

8. The ACM in accordance with claim 7 wherein said SOAP/XML server configured to send said SOAP/XML response through said web server to the network.

9. The ACM in accordance with claim 7 wherein said SOAP/XML request/response comprising at least one of hypertext transfer protocol (HTTP), hypertext markup language (HTML), and references to other files.

10. The ACM in accordance with claim 1 wherein said SOAP/XML and web server system further comprises a network interface configured for connection to the network.

11. The ACM in accordance with claim 1 wherein said ACM comprises a backplane interface electrically coupled to said ACM and said backplane electrically coupled to said backplane interface.

12. An automation control module (ACM) system comprising:
   a network;
   a computer electrically coupled to said network and configured to communicate with said network; and
   an ACM coupled to said network, said ACM comprising:
   a backplane configured to couple said ACM to at least one input/output (I/O) module;
   said ACM and said backplane are electronically coupled to a backplane interface;
   an ACM central processing unit (CPU) configured to carry out ACM functions including at least one of user logic and function block executions, I/O scanning, and communications with other devices;
   a system memory coupled to said ACM CPU, said system memory comprising an operating system; and
   a SOAP/XML and web server subsystem system electrically coupled to said backplane and said network and comprising a SOAP/XML server including an independent processor, said subsystem system configured to process simple object access protocol (SOAP)/extensible markup language (XML) requests received from said computer through said network.

13. The ACM system in accordance with claim 12 wherein a user is required to enter a valid user name and user password to access said ACM system.

14. The ACM system in accordance with claim 12 wherein said SOAP/XML and web server subsystem comprises a web server electrically coupled to said network and a SOAP/XML server electrically coupled to said ACM CPU and said web server, said SOAP/XML server configured to process SOAP/XML requests generated from said computer and transmitted from said computer through said network to said ACM system.

15. The ACM system in accordance with claim 14 wherein said web server configured to receive SOAP/XML requests from said network and transfer the SOAP/XML requests to said SOAP/XML server.

16. The ACM system in accordance with claim 15 wherein said SOAP/XML server configured to respond to SOAP requests sent from said computer through said network.

17. The ACM system in accordance with claim 15 wherein said SOAP/XML server configured to transfer ACM data from said ACM CPU through said web server and said network to said computer.

18. The ACM system in accordance with claim 15 wherein said SOAP/XML server configured to transfer ACM data received from said computer via said network and said web server to said ACM CPU.

19. The ACM system in accordance with claim 16 wherein said SOAP/XML server configured to transfer ACM data from said ACM CPU and embed said ACM data within said SOAP/XML response based on function tags embedded within said SOAP/XML request.

20. The ACM system in accordance with claim 16 wherein said SOAP/XML server configured to send said SOAP/XML response through said web server and said network to said computer.

21. The ACM system in accordance with claim 15 wherein said SOAP/XML and web server system further comprises a network interface electrically coupled to said network and said web server, said network interface configured to facilitate communication between said web server and said network.

22. The ACM system in accordance with claim 12 wherein said ACM comprises a backplane interface electrically coupled to said ACM and a backplane electrically coupled to said backplane interface.

23. The ACM system in accordance with claim 17 wherein said SOAP/XML request/response comprises at least one of hypertext transfer protocol (HTTP), hypertext markup language (HTML), and references to other files.

24. A method for management and control of an automation control module (ACM) including an ACM central processing unit (CPU), a system memory coupled to the ACM CPU, the system memory including an operating system, a backplane, at least one input/output (I/O) module coupled to the backplane, and a SOAP/XML and web server system embedded within the ACM, the SOAP/XML and web server system electrically coupled to a network and comprising a SOAP/XML server including an independent processor, said method comprising: embedding the SOAP/XML and web server system within the ACM; electrically connecting the SOAP/XML and web server system embedded within the ACM to the backplane and the ACM CPU; and processing simple object access protocol (SOAP)/extensible markup language (XML) requests from the network using the SOAP/XML and web server system.

25. The method in accordance with claim 24 wherein the SOAP/XML and web server system includes a web server electronically coupled to the network and a SOAP/XML server electrically coupled to the ACM CPU and the web server, processing SOAP/XML requests from the network using the SOAP/XML and web server system comprises processing SOAP/XML requests from the network using the SOAP/XML server.

26. The method in accordance with claim 25 wherein processing SOAP/XML requests from the network using the SOAP/XML server comprises: receiving SOAP/XML requests from the network using the web server; and transferring the SOAP/XML requests from the web server to the SOAP/XML server; and responding to the SOAP/XML requests using the SOAP/XML server.

27. The method in accordance with claim 26 wherein the SOAP/XML server processes SOAP/XML requests from the network using the SOAP/XML server comprising: receiving SOAP/XML requests from the network using the web server; transmitting the SOAP/XML requests to the SOAP/XML server using the web server; reading the SOAP/XML request from the SOAP/XML server; requesting ACM data from the ACM CPU via function tags embedded within the a SOAP/XML request; receiving the ACM data from the ACM CPU; embedding the ACM data within the SOAP/XML request using the SOAP/XML server; and sending the SOAP/XML response from the SOAP/XML server through the web server to the network.

28. The method in accordance with claim 27 wherein processing SOAP/XML requests from the network using the SOAP/XML server comprises transferring ACM data to the ACM CPU using the SOAP/XML server as directed by function tags embedded within the SOAP/XML request.

* * * * *